July 5, 1960
B. SOLOW
2,944,237
APPARATUS FOR MEASURING RESISTANCE
Filed Dec. 6, 1954
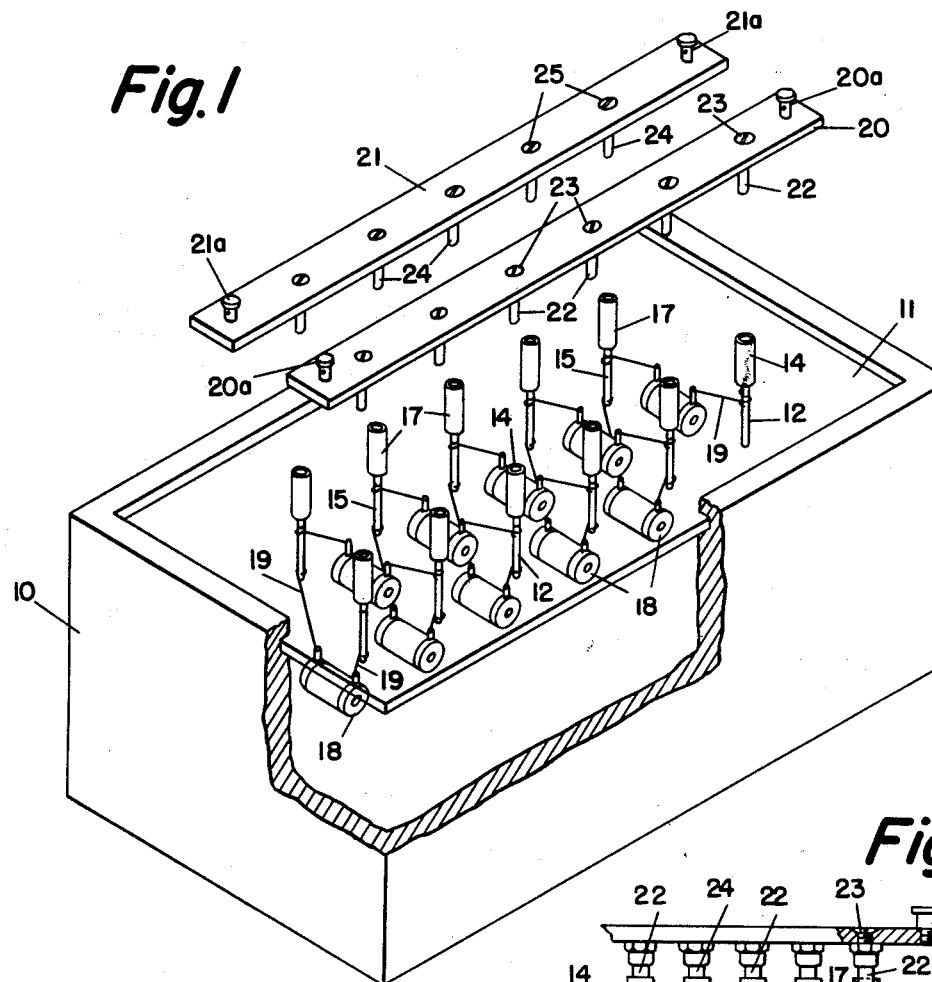
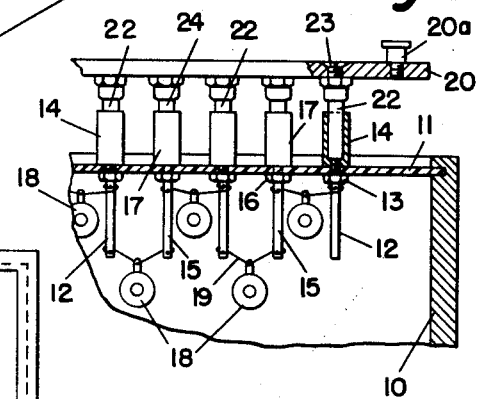
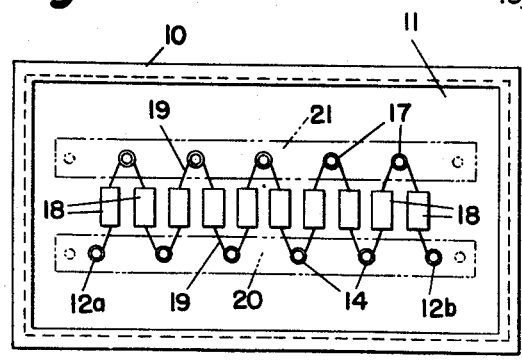
INVENTOR.
BENJAMIN SOLOW
BY
Donald S. Cohen
ATTORNEY

United States Patent Office 2,944,237
Patented July 5, 1960

2,944,237
APPARATUS FOR MEASURING RESISTANCE

Benjamin Solow, Philadelphia, Pa., assignor to International Resistance Company, Philadelphia, Pa.

Filed Dec. 6, 1954, Ser. No. 473,281

7 Claims. (Cl. 338—77)

This invention relates to a method and apparatus for measuring electrical resistors and more particularly for measuring resistors of high values by a convenient arrangement of resistors having known resistance values.

Heretofore, all accurate resistance measurement was done by comparison with "standard" resistors. Such "standard" resistors are expensive since they are very accurate resistors which are hermetically sealed so as to be unaffected by changes in temperature and humidity and must be approved by the United States Bureau of Standards. Furthermore, these "standard" resistors are commercially available only up to about 100,000 ohms. Presently resistors of much higher resistance values are made and a need has therefore developed for accurately measuring such resistors with facility. A number of "standard" resistors may be arranged in series to accomplish this but such apparatus is expensive and difficult to use.

It is therefore an object of this invention to provide a method and apparatus for accurately measuring resistors, particularly of high range, against a lower value "standard" resistance value. It is a further object to provide a method and apparatus of the above character which is inexpensive and yet accurate in measuring resistance values. It is a still further object to provide a device using commercially available inexpensive resistors for accurately measuring high resistance values. Other objects of the invention will in part be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the folowing detailed disclosure, and the scope of the invention will be indicated in the claims.

For a fuller understanding of the nature and objects of the invention, reference should be had to the following detailed description taken in connection with the accompanying drawing in which:

Figure 1 is a perspective view of the resistance measuring apparatus partially broken away;

Figure 2 is a small top plan view of the apparatus shown in Figure 1; and

Figure 3 is a fragmentary sectional view of part of the resistance measuring apparatus.

The value of a group of resistors, each of substantially the same value, measured in parallel and then measured in series provides an exact multiplier of 100 from parallel to series when 10 resistors are used. The value of this factor varies with the number of resistors in the group and is equal to the number of resistors used squared. The resistors are not of necessity identical in value since any error in this factor caused by differences in the values of the resistors is only a small fraction of the percentage difference between the values of the resistors. Thus by providing ten resistors of substantially the same value and means for easily changing their arrangement from a series connection to a parallel connection apparatus may be obtained which, when the resistors are in parallel arrangement, can be calibrated against a low range "standard" resistor after which they may be used in series arrangement to accurately measure resistors of much higher values.

Referring to the drawing, a box 10 has its top side open and plate 11 of insulating material covers this open side and is secured thereto. Plate 11 is preferably of a translucent plastic material such as polytetrafluoroethylene or polytrifluorochloroethylene, but can be of any other insulating material. Extending through suitable holes in plate 11 are six terminal posts 12 arranged in an aligned row and equally spaced from each other. Each post 12 is secured to the plate 11 by a nut 13 engaging the inside surface of the plate and a socket member 14 (Figure 3) threaded on the end of the post and engaging the outside surface of the plate. Five additional terminal posts 15 extend through the plate 11 and are arranged in an aligned row spaced from and parallel to the row formed by the posts 12. Posts 15 are staggered with respect to posts 12 so that each is midway therebetween; thus the distances between adjacent posts 12 and 15 of the two rows are equal. Additionally, posts 15 are also secured to the plate 11 by nuts 16 and socket members 17.

Ten resistors 18 are disposed within box 10 and are connected to the terminal posts 12 and 15 by conducting wires 19. Each resistor 16 is connected at one end to a post 12 and at the other end to an additional post 15 so that the resistors 18 are connected in substantially a zig-zag formation as best seen in Figure 2. Thus the resistors 18 are connected in series relation from the post 12a (Figure 2) at the one end of the row to the post 12b at the other end. Resistors 18 may be any commercially available type provided they are all of substantially the same value. However, the resistors are preferably of the precision wire wound type since they can be commercially obtained having a tolerance as small as ±0.1%.

A pair of metal bars 20 and 21 are provided to connect the resistors in parallel. Bar 20 has six plugs 22 depending therefrom and secured thereto by screws 23; plugs 22 are equally spaced along bar 20 to interfit with socket members 14. Five plugs 24 depend from bar 21 being secured thereto by screws 25; these plugs 24 are also equally spaced along to interfit with socket members 17. Plugs 22 and 24 are equal in diameter to the interior of socket members 14 and 17 so they may be inserted therein to electrically contact the sockets 14 and 17 respectively as best seen in Figure 2. Terminal wires may be secured to the bars 20 and 21 by way of posts 20a and 21a on the ends of the bars.

To use the apparatus, plugs 22 are inserted in socket members 14 to interconnect all of the terminal posts 12 through bar 20 and plugs 24 are similarly inserted in socket members 17 to interconnect all of the terminal posts 15 through bar 21 in the manner illustrated in Figure 2. Since each of the resistors 18 has one end electrically connected to a post 12 and the other end connected to post 15, the resistors 18 are thereby connected in parallel between bars 20 and 21. The resistance value of the resistors 18 connected in parallel is then determined by comparison with a "standard" resistor, for example, a Wheatstone bridge testing device built for such purpose. Having determined the value of the resistors in parallel, the bars 20 and 21 are removed, leaving the resistors 18 connected in series relation between the posts 12a and 12b at the ends of the row of posts 12. As previously stated, the value of the resistors in series is 100 times their value connected in parallel, which was previously determined. Accordingly, by connecting to posts 12a and 12b, a standard resistance is obtained 100 times the parallel when 10 resistors are used. Thus, if the value of the resistors in parallel was 10,000 ohms their value in series will be 1,000,000 ohms or 1 megohm.

After such calibration the apparatus may be used as the standard in a Wheatstone bridge testing device for measuring resistors within the range of 1 megohm in the stated example. Accordingly I provide a convenient and practical way to obtain a resistance testing device of high value. If it is desired to measure resistance values less than that provided by ten resistors it is only necessary to interconnect fewer resistors in parallel by moving bars 20 and 21 along the rows of socket members 14 and 17 so that one or more of the resistors are not included. The series resistance value of those resistors included will be the number of such resistors squared multiplied by the total resistance value thereof in parallel. Thus I have provided apparatus wherein several resistors, illustratively ten or less, can be easily and quickly changed from parallel relation to series relation so that high range resistors can be measured by comparison with a low value "standard" resistor. Not only can this apparatus be used to measure the value of resistors but it can also be used to calibrate other similar resistance measuring devices which have a value higher than any commercially available "standard" resistor. Thus a series of these resistance measuring devices can be made with different values each of which can be used to measure resistors within its value as well as for calibration of the next higher range device.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawing shall be interpreted as illustrative and not in a limting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A resistance measuring device comprising the combination of a supporting plate of an electrically insulating material, five terminals of conductive material mounted on said plate and arranged in an aligned row, six additional terminals of conductive material mounted on said plate and arranged in a second aligned row spaced from and parallel to said first row of terminals, ten resistors of substantially the same resistance value secured across the terminals of the rows and arranged in series relation, and removable means for electrically connecting together the terminals in each row so as to connect the resistors in parallel relation.

2. The combination as set forth in claim 1 in which each resistor is connected at one end to a terminal in one row and at the other end to a terminal in the other row.

3. The combination as set forth in claim 1 in which the means for electrically connecting the terminals of each row comprises a pair of elongated bars of conductive material each adapted to extend along and engage a row of the terminals.

4. The combination as set forth in claim 2 in which said first row of terminals is arranged with the terminals thereof being between the terminals of said second row so that the resistors are mounted in substantially a zig-zag formation.

5. A resistance measuring device comprising the combination of a box having one open side, a plate of an electrically insulating material covering said open side and secured to the box, five terminals of electrically conductive material extending through said plate and secured thereto, said terminals being spaced apart and arranged in an aligned row, six additional terminals of electrically conductive material extending through said plate and secured thereto, said additional terminals being spaced apart and arranged in a second aligned row spaced from and parallel to said first row of terminals, ten resistors of substantially the same resistance value within said box and connected in series relation across the terminals of the rows, each of said resistors having one end connected to a terminal in the other row, a pair of elongated bars of electrically conductive material, and means for removably connecting one of said bars simultaneously to all of the terminals in one row and the other of said bars to all the terminals in the other row so as to connect the resistors in parallel.

6. The combination as set forth in claim 5 in which the means for removably connecting the bars to the terminals comprises plugs on one and sockets on the other.

7. A resistance measuring device comprising the combination of a supporting plate of an electrically insulating material, a plurality of terminals of conducting material mounted on said plate and arranged in two parallel spaced rows, a plurality of resistors of substantially the same resistance value fixedly connected in series relation between said terminals, and removable means for connecting said resistors in parallel, said removable means comprising two elongated bars of electrically conducting material, each of said bars being of a length to extend along a separate one of the rows of terminals to engage and electrically connect all of the terminals in each row.

References Cited in the file of this patent

UNITED STATES PATENTS 2,373,156    Wilhelm _____ Apr. 10, 1945